(12) United States Patent
Sun et al.

(10) Patent No.: US 8,750,390 B2
(45) Date of Patent: Jun. 10, 2014

(54) FILTERING AND DITHERING AS PRE-PROCESSING BEFORE ENCODING

(75) Inventors: Shijun Sun, Redmond, WA (US); Cheng Chang, Redmond, WA (US); Stacey Spears, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1329 days.

(21) Appl. No.: 12/008,660

(22) Filed: Jan. 10, 2008

(65) Prior Publication Data

US 2009/0180555 A1 Jul. 16, 2009

(51) Int. Cl.
*H04N 7/12* (2006.01)
*H04N 7/26* (2006.01)

(52) U.S. Cl.
CPC .................. *H04N 7/26058* (2013.01)
USPC .................................... 375/240.29

(58) Field of Classification Search
CPC .. H04N 7/26888; H04N 7/26058; H04N 7/50
USPC ............... 375/240, 240.1, 240.26, 240.29, 375/240.02, 240.03; 345/418, 581, 589, 345/596, 619, 629, 634, 639, 640
See application file for complete search history.

(56) References Cited

U.S. PATENT DOCUMENTS

| | | | |
|---|---|---|---|
| 4,334,244 A | 6/1982 | Chan et al. | |
| 4,460,924 A | 7/1984 | Lippel | |
| 4,849,812 A | 7/1989 | Borgers et al. | |
| 5,089,889 A | 2/1992 | Sugiyama | |
| 5,289,283 A | 2/1994 | Hopper et al. | |
| 5,467,134 A | 11/1995 | Laney et al. | |
| 5,509,089 A | 4/1996 | Ghoshal | |
| 5,544,286 A | 8/1996 | Laney | |
| 5,585,861 A | 12/1996 | Taniguchi et al. | |
| 5,604,856 A | 2/1997 | Guenter et al. | |

(Continued)

FOREIGN PATENT DOCUMENTS

| | | |
|---|---|---|
| CN | 1722838 | 1/2006 |
| CN | 1728833 | 2/2006 |

(Continued)

OTHER PUBLICATIONS

"10. Configuring mythrontend," downloaded from the World Wide Web, 7 pp. (downloaded Oct. 17, 2007).

(Continued)

*Primary Examiner* — Obaidul Huq
(74) *Attorney, Agent, or Firm* — Micah Goldsmith; Glen Johnson; Micky Minhas

(57) ABSTRACT

Techniques and tools are presented for controlling artifacts such as banding artifacts, ringing artifacts and film scan artifacts in video. For example, before encoding, a pre-processor performs combined filtering and dithering on video such that the weight of dithering at a location depends on the results of filtering at the location. For the combined filtering and dithering, the pre-processor can determine a lowpass signal and highpass residual, weight dithering based on local characteristics of the highpass residual, and then combine the lowpass signal with the weighted dithering. Or, to determine the relative weight, the pre-processor can use a filter whose normalization factor varies depending on how many sample values around a location are within a threshold of similarity to a current sample value at the location. The filtering and dithering can use different strengths for luma and chroma channels.

25 Claims, 4 Drawing Sheets

(56) References Cited

U.S. PATENT DOCUMENTS

| | | | |
|---|---|---|---|
| 5,611,038 | A | 3/1997 | Shaw et al. |
| 5,625,714 | A | 4/1997 | Fukuda |
| 5,646,691 | A | 7/1997 | Yokoyama |
| 5,787,203 | A | 7/1998 | Lee et al. |
| 5,799,113 | A | 8/1998 | Lee |
| 5,835,149 | A | 11/1998 | Astle |
| 5,835,495 | A | 11/1998 | Ferriere |
| 5,905,504 | A | 5/1999 | Barkans et al. |
| 5,923,784 | A | 7/1999 | Rao et al. |
| 5,926,209 | A | 7/1999 | Glatt |
| 5,946,419 | A | 8/1999 | Chen et al. |
| 5,959,693 | A | 9/1999 | Wu et al. |
| 5,969,764 | A | 10/1999 | Sun et al. |
| 6,026,190 | A | 2/2000 | Astle |
| 6,094,231 | A * | 7/2000 | Wischer-Mann ............ 348/607 |
| 6,115,420 | A | 9/2000 | Wang |
| 6,115,689 | A | 9/2000 | Malvar |
| 6,125,147 | A | 9/2000 | Florencio et al. |
| 6,134,265 | A * | 10/2000 | Long ............................ 375/222 |
| 6,182,034 | B1 | 1/2001 | Malvar |
| 6,219,838 | B1 | 4/2001 | Cherichetti et al. |
| 6,278,735 | B1 | 8/2001 | Mohsenian |
| 6,281,942 | B1 | 8/2001 | Wang |
| 6,380,985 | B1 | 4/2002 | Callahan |
| 6,473,409 | B1 | 10/2002 | Malvar |
| 6,556,925 | B1 | 4/2003 | Mori et al. |
| 6,625,215 | B1 | 9/2003 | Faryar et al. |
| 6,728,317 | B1 | 4/2004 | Demos |
| 6,873,368 | B1 | 3/2005 | Yu et al. |
| 6,980,595 | B2 | 12/2005 | Rose et al. |
| 6,992,725 | B2 | 1/2006 | Mohsenian |
| 7,072,525 | B1 | 7/2006 | Covell |
| 7,158,668 | B2 | 1/2007 | Munsil et al. |
| 7,233,362 | B2 | 6/2007 | Wu |
| 7,308,151 | B2 | 12/2007 | Munsil et al. |
| 7,570,834 | B2 | 8/2009 | Deshpande |
| 2003/0058944 | A1 | 3/2003 | MacInnis et al. |
| 2003/0218778 | A1* | 11/2003 | Ohta ............................ 358/3.04 |
| 2003/0235247 | A1 | 12/2003 | Wu et al. |
| 2004/0170395 | A1 | 9/2004 | Filippini et al. |
| 2004/0174464 | A1 | 9/2004 | MacInnis et al. |
| 2005/0021579 | A1* | 1/2005 | Bae et al. ...................... 708/300 |
| 2005/0063475 | A1* | 3/2005 | Bhaskaran ............... 375/240.29 |
| 2005/0105889 | A1* | 5/2005 | Conklin ........................ 386/95 |
| 2005/0152448 | A1 | 7/2005 | Crinon et al. |
| 2006/0083300 | A1 | 4/2006 | Han et al. |
| 2006/0126728 | A1 | 6/2006 | Yu et al. |
| 2006/0133689 | A1* | 6/2006 | Andersson et al. ........... 382/261 |
| 2006/0165176 | A1 | 7/2006 | Raveendran |
| 2006/0268991 | A1 | 11/2006 | Segall et al. |
| 2006/0274959 | A1* | 12/2006 | Piastowski ................... 382/268 |
| 2007/0002946 | A1 | 1/2007 | Bouton et al. |
| 2007/0081586 | A1 | 4/2007 | Raveendran et al. |
| 2007/0091997 | A1 | 4/2007 | Fogg et al. |
| 2007/0140354 | A1 | 6/2007 | Sun |
| 2007/0147505 | A1* | 6/2007 | Bock ........................ 375/240.16 |
| 2007/0160126 | A1 | 7/2007 | Van Der Meer et al. |
| 2007/0230565 | A1 | 10/2007 | Tourapis et al. |
| 2007/0236743 | A1* | 10/2007 | Stanich et al. ............... 358/3.13 |
| 2007/0268964 | A1 | 11/2007 | Zhao |
| 2008/0008249 | A1 | 1/2008 | Yan |
| 2008/0013630 | A1 | 1/2008 | Li et al. |
| 2008/0024513 | A1* | 1/2008 | Raveendran ................. 345/589 |
| 2008/0063085 | A1* | 3/2008 | Wu et al. ................. 375/240.25 |
| 2008/0068446 | A1 | 3/2008 | Barkley et al. |
| 2008/0089417 | A1 | 4/2008 | Bao et al. |
| 2008/0095235 | A1 | 4/2008 | Hsiang |
| 2008/0165848 | A1 | 7/2008 | Yan et al. |
| 2008/0187042 | A1 | 8/2008 | Jasinschi |
| 2009/0003718 | A1 | 1/2009 | Liu et al. |
| 2009/0161756 | A1* | 6/2009 | Lin ........................... 375/240.02 |
| 2009/0207912 | A1 | 8/2009 | Holcomb et al. |
| 2009/0219994 | A1 | 9/2009 | Tu et al. |
| 2009/0262798 | A1 | 10/2009 | Chiu et al. |

FOREIGN PATENT DOCUMENTS

| | | |
|---|---|---|
| CN | 101040533 | 9/2007 |
| GB | 1 218 015 | 1/1971 |
| WO | 94/03988 | 2/1994 |
| WO | 2006/079997 | 8/2006 |
| WO | 2007/008286 | 1/2007 |
| WO | 2007/009875 | 1/2007 |
| WO | 2007/018669 | 2/2007 |
| WO | 2007/042365 | 4/2007 |

OTHER PUBLICATIONS

Munsil et al., "DVD Benchmark—Special Report, The Chroma Upsampling Error and the 4:2:0 Interlaced Chroma Problem," downloaded from the World Wide Web, 19 pp. (document marked Apr. 1, 2001).

Nadenau, "Integration of Human Color Vision Models into High Quality Image Compression," Thesis, 216 pp. (2000).

Orton-Jay et al., "Encoding for Blu-ray Disc and HD DVD—Reaping the Benefits of Integrated Mastering," SONIC Digital Vision, 22 pp. (document marked Apr. 12, 2007).

"VC-1/PEP and Posterization," AVS Forum, downloaded from the World Wide Web, 13 pp. (document marked Apr. 27, 2007).

Braun et al., "Motion-Compensating Real-Time Format Converter for Video on Multimedia Displays," *Proceedings IEEE 4th International Conference on Image Processing*, vol. I, pp. 125-128 (Oct. 1997).

Defee et al., "Nonlinear Filters in Image Pyramid Generation," *IEEE International Conference on Systems Engineering*, pp. 269-272 (Aug. 1991).

Elad et al., "Super-Resolution Restoration of an Image Sequence—Adaptive Filtering Approach," 24 pp. (Apr. 4, 1997).

Haddad et al., "Digital Signal Processing: Theory, Applications, and Hardware," *Computer Science Press*, pp. 257-261 (Jan. 1991).

Hsia et al., "A Parallel Median Filter with Pipelined Scheduling for Real-Time 1D and 2D Signal Processing," *IEICE Trans. Fundamentals*, vol. E83-A, No. 7, pp. 1396-1404 (Jul. 2000).

International Organization for Standardization, MPEG-4 Video Verification Model version 18.0, ISO/IEC JTC1/SC29/WG11 N3908 Coding of Moving Pictures and Audio, pp. 1-10, 299-311 (Jan. 2001).

Kim et al., "Spatiotemporal Adaptive 3-D Kalman Filter for Video," *IEEE Trans. on Image Process.*, vol. 6, No. 3, pp. 414-423 (Mar. 1997) (12 pp. printout).

Kopp et al., "Efficient 3×3 Median Filter Computations," *Institute of Computer Graphics and Algorithms*, Technical University of Vienna, Technical Report TR-186-2-94-18, 4 pp. (Dec. 1994).

Kotropoulos et al., "Adaptive LMS L-filters for Noise Suppression in Images," *IEEE Transactions on Image Processing*, vol. 5, No. 12, 48 pp. (1996).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Ranka et al., "Efficient Serial and Parallel Algorithms for Median Filtering," *IEEE Transactions on Signal Processing*, vol. 39, Issue 6, pp. 1462-4166 (Jun. 1991).

Reeves, "On the Selection of Median Structure for Image Filtering," *IEEE Transactions on Circuits and Systems II: Analog and Digital Signal Processing*, vol. 42, pp. 556-558 (Aug. 1995).

van Roosmalen et al., "Noise Reduction of Image Sequences as Preprocessing for MPEG2 Encoding," *Proceedings of EUSIPCO*, 4 pp. (Sep. 1998).

Russ, "The Image Processing Handbook," 2nd Edition, CRC Press, pp. 164-166 (1994).

Senel et al., "Topological Median Filters," 44 pp. http://citeseer.nj.nec.com/277604.html, (Dec. 15, 1999).

Tomasi et al., "Bilateral Filtering for Gray and Color Images," *IEEE Int'l Conf. on Computer Vision*, 8 pp. (Jan. 1998).

Tramini et al., "Intraframe Image Decoding Based on a Nonlinear Variational Approach," *International Journal of Imaging Systems and Technology*, vol. 9, No. 5, pp. 369-380 (Dec. 1998).

(56) References Cited

OTHER PUBLICATIONS

Tsekeridou et al., "Morphological Signal Adaptive Median Filter for Still Image and Image Sequence Filtering," *IEEE Int. Symposium on Circuits and Systems*, 4 pp. (May 1998).
Turaga et al., "Content-Adaptive Filtering in the UMCTF Framework," *IEEE Int'l Conf. on Acoustics, Speech, and Signal Processing*, vol. I, pp. 821-824 (Apr. 6, 2003).
Tziritas et al., "A Hybrid Image Coder: Adaptive Intra-Interframe Prediction Using Motion Compensation," *Sixth MDSP Workshop*, pp. 224-230 (Sep. 1989).
van der Schaar et al., "Unconstrained Motion Compensated Temporal Filtering (UMCTF) Framework for Wavelet Video Coding," *IEEE Int'l Conf. on Acoustics, Speech, and Signal Processing*, vol. II, pp. 581-584 (Apr. 2003).
Wang et al., "Adaptive Image Matching in the Subband Domain," *Proc. SPIE*, 12 pp. (Dec. 2004).
Wong, "Nonlinear Scale-Space Filtering and Multiresolution System," *IEEE Transactions on Image Processing*, vol. 4, No. 6, pp. 774-787 (Jun. 1995).
Wu et al., "Bit-depth scalability compatible to H.264/AVC-scalable extension," *J. Vis. Commun. Image R.*, vol. 19, pp. 372-381 (Jun. 2008).
Yli-Harja et al., "Efficient Representation and Implementation of Recursive Median Filters and Their Cascade Compositions," *Proceedings of the Finnish Signal Processing Symposium*, pp. 84-88 (May 1999).
Yli-Harja et al., "Run-length Distributions of Recursive Median Filters Using Probabilistic Automata," *Proceedings of Scandinavian Conference on Image Analysis*, pp. 251-258 (Jun. 1999).
Eleftheriadis et al., "Dynamic Rate Shaping of Compressed Digital Video," *IEEE Transaction on Multimedia*, vol. 8, No. 2, Apr. 2006, pp. 297-314.

\* cited by examiner software 180 implementing described
strategies for filtering and dithering

FILTERING AND DITHERING AS PRE-PROCESSING BEFORE ENCODING

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

A basic goal of compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

Perceptible flaws in video after encoding or other processing are sometimes called artifacts in the video, as they result from and show that the encoding or other processing occurred. These artifacts include blocking artifacts, banding artifacts and ringing artifacts.

Block patterns that are introduced by compression and appear in reconstructed video are often called block artifacts. Block artifacts can be especially noticeable in smoothly varying, gradient regions, such as video of a clear sky. Block artifacts result, for example, from splitting a video picture into blocks for encoding, where the encoding includes a frequency transform process and quantization of AC coefficients for the blocks. As bit rate decreases and quantization of AC coefficients becomes more dramatic, block artifacts tend to become worse.

Banding or contouring artifacts occur, for example, when sample values in a picture are converted from a high bit resolution (e.g., 10 bits or 12 bits per sample value) to a lower bit resolution (e.g., 8 bits per sample value). When sample values are clipped to the lower bit resolution, steps between bands of values may become perceptible, especially in regions with smoothly changing sample values (e.g., a gradual transition from light to darker). Suppose a picture includes 10-bit sample values that vary gradually from 65 (dark black) to 74 (lighter black). When converted to 8-bit sample values, the 8-bit values vary between 16 and 18, and noticeable boundaries appear between 16 and 17, and between 17 and 18. Banding artifacts tend to be more noticeable in dark regions and for animation content, computer-generated effects or other content having unnatural, smooth gradients. In practice, banding artifacts are often introduced when high-quality video (e.g., 12-bit or 10-bit 4:4:4/4:2:2 studio-quality 3840×2160 video) is converted to a lower resolution form (e.g., 8-bit 4:2:0 1920×1080 video) for encoding. Many codecs work with 8-bit video.

Ringing artifacts can occur for various reasons. They might occur, for example, when a small object such as a ball moves across a static background of a picture. The ringing artifact appears as a ripple pattern or other band of noise going away from the edge of the artifact into the background of the picture. Such ringing artifacts can result from the frequency transform process and quantization for a block that includes the object or part of the object. Ringing artifacts can also be introduced at edges by excessive sharpening during editing.

Other types of ringing artifacts can be introduced during video processing, appearing as repeated vertical or diagonal edges where a dark region changes to light, or vice versa, as a hardware component adjusts to the change in intensity.

Other artifacts such as film scan artifacts and film grain artifacts can result from the process of scanning film into a digital form or from the film medium itself. Film grain artifacts result from grains used to record images in film, and show up as perceptible "graininess" in the video. Some types of video capture devices can also produce artifacts resembling film grain artifacts. Unlike other types of artifacts, which are viewed as undesirable, certain types and amounts of film grain have aesthetic appeal and are deemed desirable by content producers.

Film scan artifacts are introduced during scanning of high-resolution film into a digital format. These artifacts can be caused, for example, by scratches or dust on film or in the film scanning environment, and can show up in the digital video as perceptible smearing or scratches. Or, they can be introduced due to irregularities in the scanning process or scanning equipment, for example, by a faulty or mis-calibrated sensor in a row of sensors, and show up in the digital video as anomalies like "phosphor lines" along a scan direction.

One approach to controlling artifacts in video is to allocate more bit rate to the video during encoding. By using more bits during encoding, artifacts such as block artifacts and some ringing artifacts can be avoided or mitigated. Other types of artifacts can be avoided by careful film scanning and image sharpening before encoding.

Some post-processing approaches to controlling artifacts process video after decoding so as to smooth over or otherwise hide artifacts. Some systems adaptively filter across block boundaries to reduce the visibility of block artifacts. Other systems use dithering during post-processing to adjust the sample values of reconstructed pictures. For example, dithering can introduce small adjustments to values around a jagged edge so that the human viewer "averages" the values and perceives a smoother edge.

While previous approaches to controlling artifacts provide acceptable performance in some scenarios, they do not have the advantages of the techniques and tools described below.

SUMMARY

In summary, the detailed description presents techniques and tools for controlling artifacts in video. For example, some techniques and tools help reduce the perceptual impact of banding artifacts in smooth gradient regions when switching from a high-resolution bit depth to a lower resolution bit depth during pre-processing before encoding. Other techniques and tools help reduce the perceptibility of ringing artifacts or film scan artifacts by using combined filtering and dithering during pre-processing.

According to a first set of techniques and tools, a system performs combined filtering and dithering on video such that relative weight of the dithering at a location depends at least in part on the results of the filtering at the location. For example, the system determines a lowpass signal and highpass residual signal for the video, weights the dithering based at least in part on local characteristics of the highpass residual signal, and then combines the lowpass signal with the weighted dithering. The combined filtering and dithering can be performed before clipping of sample values to a lower bit depth, or after clipping of sample values to a lower bit depth. For the filtering, the system can select a type of filter from among multiple available types of filters. Each of the multiple available types of filters can be adapted for removal of a different type of artifact. In some embodiments, the available types of filters include a type adapted for removing film scan artifacts.

According to a second set of techniques and tools, a system filters video using a filter whose normalization factor varies at a location depending on how many sample values around the location are within a threshold of similarity to a current sample value at the location. The filtering can use different strengths for luma and chroma channels. When the system also adds dithering, the system can use different strengths for dithering for the luma and chroma channels. The filtering and/or dithering can be performed selectively, depending on the flatness of a region being processed.

According to a third set of techniques and tools, a system pre-processes video for encoding, encodes the pre-processed video, and outputs the encoded video in a compressed video bit stream. The pre-processing includes selectively filtering the video to smooth the video, adding dithering, and clipping the dithered, filtered video to decrease bit depth. The pre-processing can also include changing the relative strength of the dithering depending on local image complexity of the video and/or changing the relative strength of the dithering between luma and chroma channels.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

The present application relates to techniques and tools for controlling artifacts in video. For example, during pre-processing of video before encoding, a system performs filtering and/or adds dithering so as to reduce banding artifacts, ringing artifacts or film scan artifacts.

Various alternatives to the implementations described herein are possible. Certain techniques described with reference to flowchart diagrams can be altered by changing the ordering of stages shown in the flowcharts, by splitting, repeating or omitting certain stages, etc. The various techniques and tools described herein can be used in combination or independently. Different embodiments implement one or more of the described techniques and tools. While the filtering and dithering described herein are often shown in the context of pre-processing for video encoding, the filtering and dithering can instead be used in other contexts (e.g., post-processing).

Some of the techniques and tools described herein address one or more of the problems noted in the background. Typically, a given technique/tool does not solve all such problems. Rather, in view of constraints and tradeoffs in encoding time, resources, quality, and/or desired artifact removal, the given technique/tool improves performance for a particular implementation or scenario.

I. Computing Environment

Figure 1:
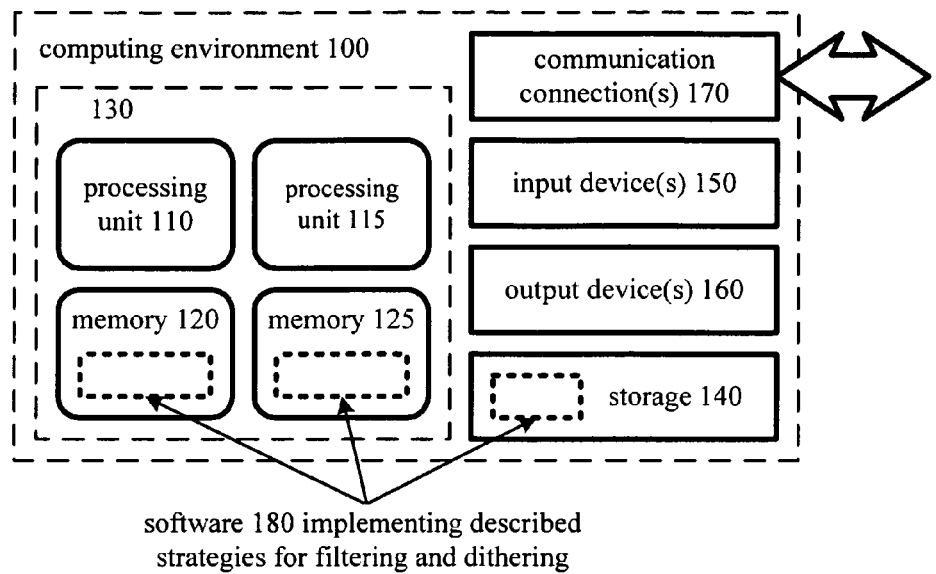
FIG. 1 is a block diagram of a suitable computing environment in which several described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools described herein may be implemented in diverse general-purpose or special-purpose computing environments.

With reference to FIG. 1, the computing environment (100) includes at least one CPU (110) and associated memory (120) as well as at least one GPU or other co-processing unit (115) and associated memory (125) used for video acceleration. In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120, 125) may be volatile memory (e.g., registers, cache, RAM), non-volatile memory (e.g., ROM, EEPROM, flash memory, etc.), or some combination of the two. The memory (120, 125) stores software (180) for implementing a system with one or more of the described techniques and tools for combined filtering and dithering.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the filtering and dithering.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120, 125), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

II. Generalized Video Processing System

Figure 2:
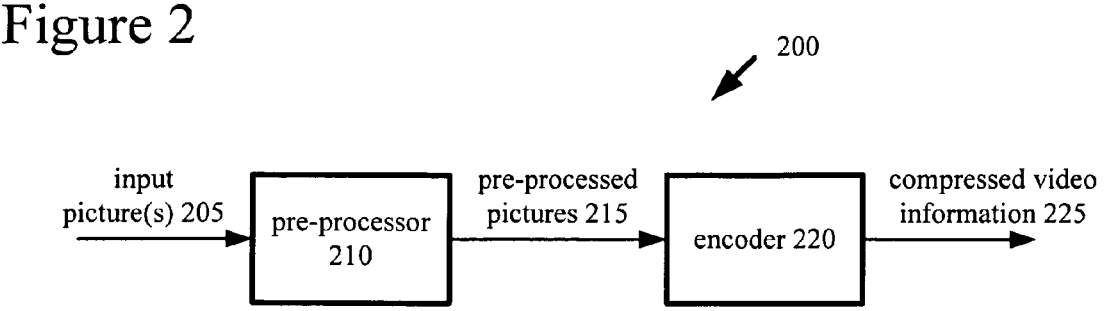
FIG. 2 is a block diagram of a video processing system in conjunction with which several described embodiments may be implemented.

FIG. 2 is a block diagram of a generalized video processing system (200) in conjunction with which some described embodiments may be implemented. The system (200) receives a sequence of video pictures (205) including a current picture and produces compressed video information (225) as output to storage, a buffer, or a communications connection.

The system (200) includes a pre-processor (210) that performs pre-processing before encoding. For example, the pre-processor (210) receives video pictures in a 10-bit per sample value format, and clips sample values to a lower bit depth such as 8-bits per sample. Or, the pre-processor (210) receives video pictures in a 4:4:4, 4:2:2 or other chroma sampling format and converts them to 4:2:0 format. Or, the pre-processor (210) smoothes input video pictures using a lowpass filter or other filter so as to selectively remove high-frequency components. Or, the pre-processor (210) selectively adds dithering to the video pictures. In some implementations, the pre-processor (210) performs a combination of filtering, dithering, chroma sampling rate conversion, and clipping. The pre-processor (210) can use any of the approaches described below for filtering and/or adding dithering.

The layout of stages of processing in the pre-processor (210) depends on implementation. In some configurations, the pre-processor (210) receives video that has already been converted to lower resolution format such as 4:2:0 with 8-bit samples (or it first converts video to the lower resolution format), and then the pre-processor (210) performs combined filtering and dithering on the lower resolution video pictures before encoding. The combined filtering and dithering can even be a separate pre-encoding stage. Such configurations are useful when source video content is only available to the system (200) in the lower resolution format. In other configurations, the pre-processor (210) performs combined filtering and dithering on higher resolution video pictures, and then performs operations such as clipping to a lower bit depth, color space conversion (e.g., from RGB to YUV), and/or chroma sub-sampling on the filtered, dithered video. Such configurations allow for filtering and dithering to be performed in other color spaces (such as RGB), which may provide more efficient noise removal.

The system (200) also includes an encoder (220) that compresses the pre-processed video pictures (215), outputting a bit stream of compressed video information (225). The exact operations performed by the encoder (220) can vary depending on compression format. The format of the output bitstream can be a Windows Media Video or SMPTE 421M ("VC-1") format, MPEG-x format (e.g., MPEG-1, MPEG-2, or MPEG-4), H.26x format (e.g., H.261, H.262, H.263, or H.264), or other format.

The relationships shown between modules within the system (200) indicate general flows of information in the system; other relationships are not shown for the sake of simplicity. Particular embodiments of typically use a variation or supplemented version of the generalized system (200). Depending on implementation and the type of processing desired, modules of the system can be added, omitted, split into multiple modules, combined with other modules, and/or replaced with like modules. For example, the encoder can be split into multiple modules associated with different stages of encoding. In alternative embodiments, systems with different modules and/or other configurations of modules perform one or more of the described techniques.

III. Filtering and Dithering During Pre-Processing to Enhance Quality.

This section describes techniques and tools for filtering and/or adding dithering to video during pre-processing before encoding. In particular, techniques and tools are described for adaptively filtering video and adding dithering when converting from a high-resolution format (e.g., 10-bit per sample, high spatial resolution video) to a lower-resolution format (e.g., 8-bit per sample, lower spatial resolution video). The filtering and dithering can be used as pre-processing before encoding with an H.264 encoder, VC-1 encoder, or other type of encoder.

A. Context and Example Uses

Many video encoders currently in use, including encoders that produce bit streams according to the MPEG-x, H.26x and VC-1 standards, accept input video in a particular video format. That format is 4:2:0 YUV (or Y'CbCr) video with 8-bits per sample value, and with a spatial resolution such as 720× 480, 1280×720 or 1920×1080 samples per picture. In contrast, studios and other content producers often produce and edit video in higher resolution formats with 10 or 12 bits per sample value, macroblocks organized in 4:2:2 or 4:4:4 format, a color space other than YUV and/or a spatial resolution of 3656×2664, 3840×2160 or 4096×1714 samples per picture.

YUV refers to a color space for sample values in which each tiny picture element ("pixel") is made up of a Y sample, U sample and V sample. The Y sample, often called luma or luminance, generally indicates brightness. The U and V (or Cb and Cr) samples, often called chroma or chrominance, generally indicate color components. Other well known color spaces include RGB (linear RGB), R'G'B' (gamma-corrected RGB), Y'CbCr and YIQ. In color space conversion, colors in one color space are mapped to another color space. Gamma correction (conventionally indicated with the ' symbol) can help control overall brightness.

4:2:0 refers to a way of sub-sampling chroma values such that U and V (or Cb and Cr) are sub-sampled by a factor of two both horizontally and vertically. This in turn affects macroblock organization for digital video when pictures are divided into macroblocks. A 4:2:0 macroblock has 16×16 luma samples and two co-located 8×8 blocks of chroma samples. Other macroblock and chroma sub-sampling formats can provide higher spatial resolution for chroma. For 4:4:4 video, luma and chroma have the same sampling rate.

The number of bits per sample indicates how many bits—e.g., 8, 10 or 12—are used to represent each sample value. The number of bits per sample affects how many different sample values a sample can possibly have—e.g., up to 256, 1024 or 4096—which affects how many gradations in brightness or color the video can show.

In some example uses, high-frequency dithering signals are added to video pictures when the video pictures are converted from a high-resolution source format to a lower resolution format for encoding. The lower resolution format can have lower spatial resolution, chroma sampling rate, and/or bit depth. The human visual system is relatively sensitive to subtle low-frequency signal level changes, especially in dark image areas, but is not especially sensitive to high-frequency signals. Conventional pre-processing removes high-frequency noise before encoding. When a high spatial-temporal frequency dithering signal is added appropriately, however, the human visual system "integrates" the dithering signal with the video signal. This effectively makes the dithering signal perceptually unnoticeable, while smoothing out otherwise perceptible banding artifacts or other artifacts caused by limited bit depth in the video images or video display. For example, when viewed from a proper distance such as three picture heights, an added dithering signal can create the perception of luma sample values that are in-between integer values, as the human visual system integrates the samples values from the video signal with dithering together.

In some implementations, the dithering signals are applied in the final rounding stage of conversion to the lower resolution format, before clipping. In other implementations, the dithering signals are applied after clipping. The strength of the dithering signals depends on implementation and can vary adaptively depending on chroma sensitivity, local image characteristics, the characteristics of a highpass signal for the video, whether dithering is added to luma samples or chroma samples, or other factors. Typically, the signal strength of the dithering signal (or standard variation) is well within an integer level.

In other example uses, dithering is combined with smoothing when video pictures are converted from a high-resolution source format to a lower resolution format for encoding. Conversion to a lower bit depth format (e.g., conversion from 10-bit samples to 8-bit samples) can be separated from the addition of dithering signals. Problem can arise, however, when lower bit depth content is created without considering the dithering process. In particular, contouring artifacts in smooth gradient areas can be a problem, especially for animation content and computer-generated pictures. Therefore, according to some embodiments, a video pre-processor smoothes out contouring artifacts with a combination of filtering and dithering, significantly improving the visual quality of encoding results.

In other example uses, a higher strength dithering signal is selectively added to a video signal so as to prompt an encoder to preserve quality during encoding. In some encoding scenarios, an encoder is too aggressive in lossy compression, and low-level high-frequency signals that the content producer seeks to preserve are lost. These, high-frequency signals can be for film grain, for dithering to perceptually smooth over artifacts, or for image texture. Removal of these high-frequency details can cause extensive block artifacts in the reconstructed pictures, if the sample values of blocks are reconstructed to the same value for a flat appearance. In some cases, the high-frequency details are lost even when more bits are allocated to encoding. Therefore, according to some embodiments, a video pre-processor increases the strength of the dithering signal so that additional high-frequency signals are detected by the encoder, which tends to result in smoother visual quality in encoding results. The increased strength dithering can be used in combination with filtering during the pre-processing.

In other example uses, different filters are used in pre-processing to remove different types of artifacts and undesirable noise patterns in pictures. Artifacts typically have characteristics associated with their source. Film scanning in telecine conversion can cause film scan artifacts, careless image sharpening during studio editing can cause ringing artifacts, and so on. Therefore, in some embodiments, a video pre-processor uses a filter adapted to remove film scan artifacts, a filter adapted to remove ringing artifacts, and/or another filter adapted to remove another type of artifact or break up another noise pattern before encoding. This can improve image quality by removing undesired image artifacts and noise without causing much perceptible damage to the filtered pictures. Practically, there are benefits to using a filter mechanism that simplifies the selection and substitution of different types of filters (adapted for removal of different types of artifacts) to reconfigure pre-processing.

B. Pre-Processing with Filtering and Dithering

Figure 3:
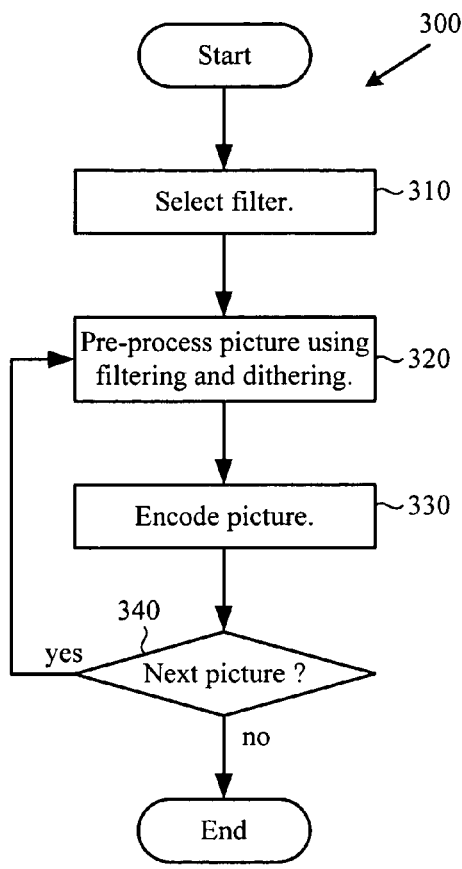
FIG. 3 is a flowchart illustrating a generalized technique for pre-processing using filtering and dithering to enhance video quality.

FIG. 3 shows an example technique (300) for pre-processing using filtering and dithering to enhance video quality. A system such as the processing system (200) shown in FIG. 2 or other system performs the technique (300).

To start, the system optionally selects (310) a filter from among one or more available filters adapted for removal of different types of artifacts, for removal of different noise patterns, or for other desired effects. For example, the system selects between a de-ringing filter, a filter to remove scan artifacts and one or more other filters. The system typically applies the selected filter during later filtering operations, but can also use one or more filters before the later operations to remove multiple types of artifacts. Alternatively, the system always uses the same type of filter for filtering.

The system then pre-processes (320) a picture using filtering and dithering. For example, the system uses an implementation of one of approaches explained with reference to FIG. 4, 5, or 7 for the filtering and dithering. Alternatively, the system uses an implementation of another approach for the filtering and dithering.

Next, the system encodes (330) the pre-processed picture using an encoder. The encoder can be a Windows Media Video encoder, VC-1 encoder, MPEG-x encoder, H.26x encoder, or other encoder.

The system then determines (340) whether to end or continue by pre-processing (320) the next picture. Although FIG. 3 shows filter selection (310) outside of this loop, alternatively, the system selects (310) filter(s) on a picture-by-picture basis or other basis as part of the loop.

C. Adapting Relative Weights of Filtering and Dithering

Figure 4:
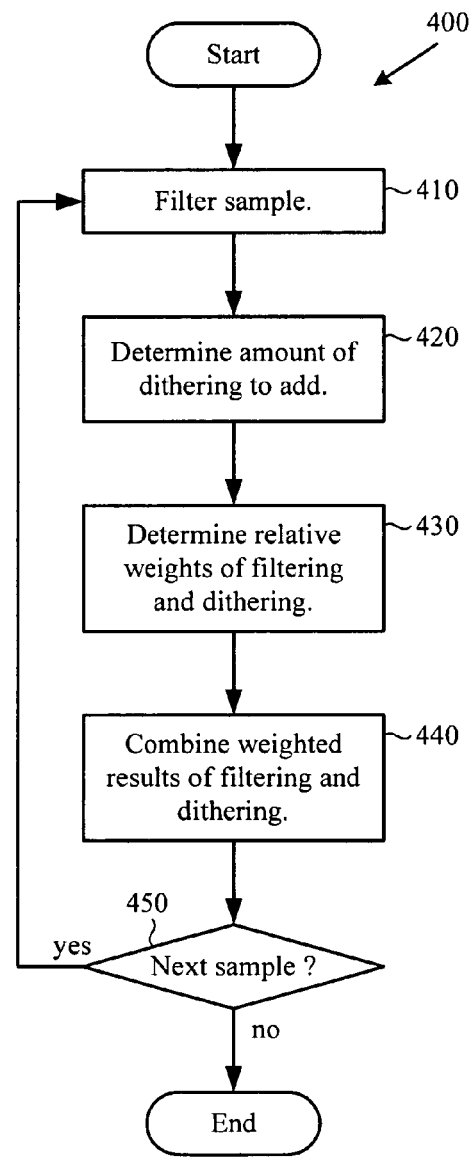
FIG. 4 is a flowchart illustrating a generalized technique for filtering video and adding dithering, where the relative weights of the filtering and the dithering adaptively change.

FIG. 4 shows an example technique (400) for filtering video and adding dithering to an input picture, where the relative weights of the filtering and the dithering adaptively change. A system such as the processing system (200) shown in FIG. 2 or other system performs the technique (400). Alternatively, the technique (400) is performed during post-processing of pictures after decoding or at another stage of processing.

The system filters (410) a current sample and determines (420) an amount of dithering (if any) to add at the current sample. For example, the system performs filtering and dithering according to one of the implementations of the first or second group of approaches, as described below. Alternatively, the system uses a different filter and/or mechanism for selectively adding dithering.

The system determines (430) relative weights of the dithering and filtering. In practice, this can be implemented by changing the weight of only the dithering, changing the weight of only the results of filtering, or changing the weights of both the dithering and the results of the filtering. The different implementations for the first and second groups of approaches provide several example ways of performing the relative weighting.

Finally, the system combines (440) the weighted results of the filtering and dithering. The details of the combination (440) depend on how the filtering (410), dithering and relative weighting (430) are implemented. Although FIG. 4 shows the combination (440) stage following the determination (430) of relative weights, in some implementations the order of the determination of dithering (420) and determination (430) of relative weights is switched.

The system then determines (450) whether to end or continue by filtering (410) the next sample. In this way, the system continues on a sample-by-sample basis through the samples of the picture. Although FIG. 4 shows the technique (400) repeating on a sample-by-sample basis, alternatively, the system repeats all or part of technique (400) on some other basis, for example, filtering the entire picture then performing the remaining operations on a sample-by-sample basis.

D. First Group of Approaches to Combined Filtering and Dithering

In some embodiments, a pre-processor or other tool combines dithering with filtering that uses a filter whose normalization factor adaptively varies. For example, the normalization factor varies depending on the local image complexity of the area being filtered. Such combined filtering and dithering can help reduce contours in smooth gradient regions when converting from a high-quality, high bit depth format to a lower quality, lower bit depth format.

Depending on implementation, different filtering and/or dithering strengths can be used for luma and chroma samples. The filtering and/or dithering strengths can also be user-adjustable to provide content producers with more control. The filtering and dithering can be selectively disabled depending on local image characteristics.

1. Generalized Technique

Figure 5:
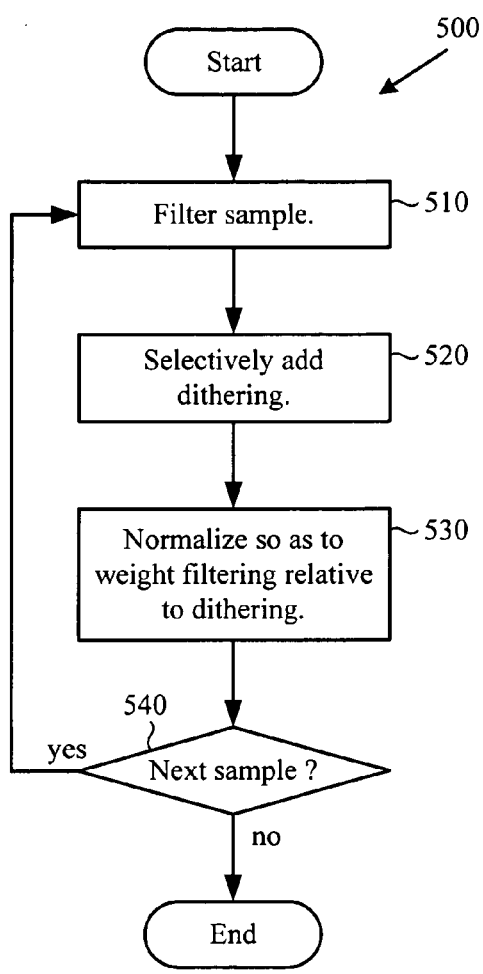
FIG. 5 is a flowchart showing details of the weighted filtering and dithering of FIG. 4 according to a first group of approaches, in which normalization factor varies.

FIG. 5 shows a technique (500) for weighted filtering and dithering for an input picture, in which normalization varies depending on the results of the filtering. A system such as the processing system (200) shown in FIG. 2 or other system performs the technique (500) during pre-processing. Alternatively, the technique (500) is performed during post-processing of pictures after decoding or at another stage of processing.

The system filters (510) a current sample of the picture. For example, the system uses an adaptive threshold filter along each of one or more lines of samples that include the current sample. Or, the system uses a corresponding two-dimensional filter. Example implementations of such filters are described in detail in the next section. The strength of the filtering (e.g., as set according to a threshold value) can vary for luma samples relative to chroma samples, depending on chroma sensitivity, depending on user settings, and/or depending on other factors. The filtering can be selectively disabled depending on local picture characteristics. Alternatively, the system uses another filter.

The system selectively adds (520) dithering to the current sample. For example, the system determines a dithering offset for the location of the current sample. Example implementations of functions to generate a 2D dithering signal for a picture or 3D dithering signal for a series of pictures are described in the next section.

The system then normalizes (530) the results of filtering and dithering for the current sample. For example, the normalization factor for the filtering depends on how many samples (equally) contribute values for the filtering of the current sample. In some implementations, the relative weight of the dithering for the current sample decreases as more samples contribute to the filtering of the current sample, and the relative weight increases as fewer samples contribute to the filtering of the current sample. Alternatively, the system uses another mechanism for normalization.

The system then determines (540) whether to end or continue by filtering (510) the next sample. In this way, the system continues on a sample-by-sample basis through the samples of the picture. Although FIG. 5 shows the technique (500) repeating on a sample-by-sample basis, alternatively, the system repeats all or part of the technique (500) on some other basis. In some implementations, the samples subjected to the combined filtering and dithering according to the technique (500) are previously clipped to a lower bit depth, converted to a color space for encoding, and chroma sub-sampled. In other implementations, one or more of the clipping, color space conversion and chroma sub-sampling stages follows the combined filtering and dithering.

2. Example Implementations

This section provides implementation details for example implementations of the first group of approaches. In general, the combined filtering and dithering for these approaches has two integrated components: a 2D lowpass filter and dithering. In practice, these can be performed at the final rounding stage of lowpass filtering during pre-processing before encoding. For a current sample value $s(x, y)$ at location $(x, y)$ in an input picture, the combined filtering and dithering can be represented as follows:

$$s'(x, y) = clip_8\left[\frac{1}{N}\left(\sum_{i,j \in (-K,K)} w(i, j) \cdot s(x+i, y+j) + D \cdot r(x, y)\right)\right]. \quad (1)$$

In this equation, $w(i, j)$ represents a 2D lowpass filter that has a normalization factor of $N$, and $K$ represents the filter range. $D$ represents a relative strength control parameter for the dithering, and $r(x, y)$ represents the value for the dithering noise signal at location $(x, y)$. The function $clip_8$ represents a clipping of the filtered, dithered results to the most significant 8 bits. Thus, $s'(x, y)$ represents the filtered sample value with dithering added, clipped to an unsigned 8-bit integer.

Figure 6:
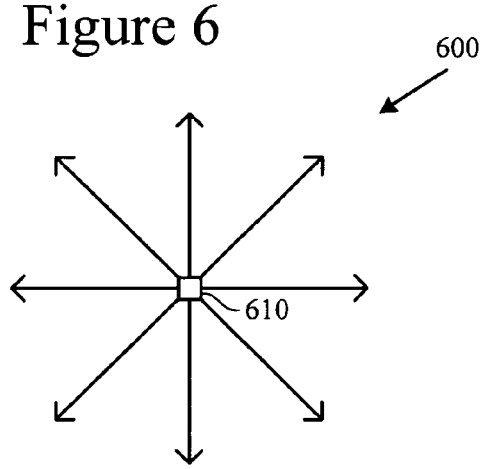
FIG. 6 is a chart illustrating axes of filtering in some implementations.

The 2D filter can be implemented as a 2D window or as a combination of 1D filters along one or more axes. FIG. 6 shows axes along four directions: horizontal, vertical, top left to bottom right, and bottom left to top right, each including the current sample location (610). Sample values at locations that do not fall on one of these axes are given no weight (w(i, j)=0). Sample values at locations that do fall on one of these axes are given full weight (w(i, j)=1) and count towards the normalization factor. Alternatively, the filter uses another shape.

The size value K indicates the possible extent of filtering using the filter. In one implementation, K=8, and sample locations from −8 to +8 horizontally and vertically relative to the current location (x, y) are potentially considered.

In some implementations, within the window, the filter uses a threshold to exclude certain locations. Without loss of generality, the following rule shows how a threshold adaptively changes which sample locations contribute to filtering in a 1D horizontal window. The location offset m represents an extent of similar values within the 1D window, moving away from the current location (x, y). For example, the offset m is set to be the minimum absolute value of i that satisfies the following constraint:

$$|s(x+i,y)-s(x,y)|>T \qquad (2),$$

for −K<i<K. If no value of i satisfies the constraint, m=K. The adaptive filter is symmetric for the sake of simplicity; the same offset m is used in each direction. Alternatively, different offset values are used in different directions away from the current location. The threshold value T is a filter threshold control parameter. Various considerations for setting the value T are detailed below. Sample values at locations within the offset m relative to the current location (x, y) are given weight in filtering, and other sample values in the 1D window are not.

$$w(i,j) = \begin{cases} 1 & |i|<m \\ 0 & \text{otherwise} \end{cases}, \qquad (3)$$

where j=0 for filtering in the 1D horizontal window, and −K<i<K.

Consider the sequence of sample values 67, 67, 67, 68, 68, 69, 69, 70, 71, 72, 73, 73, 74, 75, 76 in a 1D horizontal window, where the current sample value s(x, y)=70. If the T=3, the offset value m=5 since at offset+5|74−70|>3.

Similarly, for the adaptive threshold rule along a 1D vertical window, j varies from −K<j<K when a location offset m is found. For the adaptive threshold rule along a diagonal 1D window, both i and j can vary, where i=j (for one diagonal shown in FIG. 6) or i=−j (for the other diagonal shown in FIG. 6), within the limits of −K and K to find location offset m. For a 2D window, Euclidean distance to locations at different values of i and j, within the limits of −K and K, can be considered to find the location offset m.

Whether or not adaptive threshold rules are applied, when the values of w(i, j) are set, the normalization factor N is determined. In some implementations, the tap coefficients of w(i, j) are either 0 or 1 for the sake of simplicity. The normalization factor N is simply the count of locations where w(i, j)=1. More generally, different locations in w(i, j) can have different tap values, for example, to provide more weight at the current location, or to implement a bilinear or bicubic filter, or to implement a de-ringing filter or other filter instead of a lowpass filter, in which case the tap values for locations contributing to filtering are summed to determine the normalization factor N.

For implementations of the combined filtering and dithering represented in equation (1), the strength of the filtering and dithering can effectively be controlled by setting the parameter values T, K, and D. Increasing K increases the possible window size for filtering, which potentially results in stronger filtering. Increasing T tends to cause more locations to contribute to filtering, as more sample values satisfy the similarity constraint, which tends to cause stronger filtering. In some implementations, the threshold strength parameter T is one of {1, 3, 5}, depending on user selection of threshold strength. Alternatively, the threshold strength has more or fewer possible values, or different values, or has a default value.

Increasing the dithering strength parameter D increases the magnitude of the offsets added to sample values for dithering, and decreasing D decreases the magnitude. In some implementations, the dithering strength parameter D is one of {1.0, 1.5, 2.0}, depending on user selection of dithering strength. Alternatively, the dithering strength has more or fewer possible values, or different values, or has a default value.

The strength of filtering and/or dithering can vary between the luma and chroma channels. In general, the strength of filtering and dithering can be stronger for chroma samples, compared to luma samples, since the human visual system is less sensitive to the impacts of filtering and dithering in the chroma channels. For example, in implementations using the parameters T and D, the dithering strength parameter $D_{chroma}$ is one of {1.5, 2.5, 4.0} and the threshold strength parameter $T_{chroma}$ is one of {2, 4, 6}, depending on user selection of the chroma strength levels for dithering and filtering, respectively. Alternatively, the strength parameters have more or fewer possible values, or different values, or have default values.

Moreover, in some implementations, the strength of filtering and/or dithering for chroma channels can vary depending on measures of chroma sensitivity for the respective samples values being filtered. According to one metric, chroma sensitivity $c_s$ is:

$$c_s=(R'^2+G'^2+B'^2)/3Y'^2 \qquad (4),$$

where R', G', and B' represent the normalized sample values for R (red), G (green), and B (blue) channels, respectively, and Y' represents the luma sample value. The perceptual impacts from the R, G, and B channels are equally weighted, and gamma conversion is approximated (with a parameter 2 instead of typically 2.2). In general, the higher the chroma sensitivity is for a sample, the stronger the filtering/dithering is for the sample.

In some implementations, the combined filtering and dithering are adaptively disabled for some image regions. In some encoding scenarios, very clean and flat image regions, which are typical in animation content, do not benefit from the combined filtering and dithering. For example, the following condition is checked before applying the combined filtering and dithering.

$$|s(x,y)-s_{filtered}(x,y)|>T_{flat} \qquad (5),$$

where $s_{filtered}(x, y)$ represents a corresponding current sample in a lowpass filtered version of the picture, and the parameter $T_{flat}$ is a small number such as 0.001. This helps skip filtering and dithering for flat or extremely smooth regions where the risk of encountering contouring artifacts is negligible.

More generally, depending on the potential visibility of encoding artifacts, the strength parameters for filtering and/or dithering can be adjusted adaptively.

Depending on implementation, the dithering signal can be white noise, high-frequency noise such as blue noise, or another type of noise signal. For example, a 3D highpass array can be pre-generated as a 3D array (time series of 2D arrays) of white noise signals passed in all three directions through a 1D highpass filter with periodic padding. Moreover, during video playback, a 2D dither pattern can be applied periodically across all channels of a whole picture.

E. Second Group of Approaches to Combined Filtering and Dithering

In some embodiments, a pre-processor or other tool combines filtering and dithering, where the weight of the dithering depends at least in part on results of the filtering. For example, the filtering and the dithering are tightly combined and, on a sample-by-sample basis, the dithering signal weight dynamically changes based on the local statistics of filtering residuals.

Depending on implementation, different filtering and/or dithering strengths can be used for luma and chroma samples. The filtering and/or dithering strengths can also be user-adjustable to provide content producers with more control. The filtering and dithering can be selectively disabled depending on local image characteristics.

1. Generalized Technique

Figure 7:
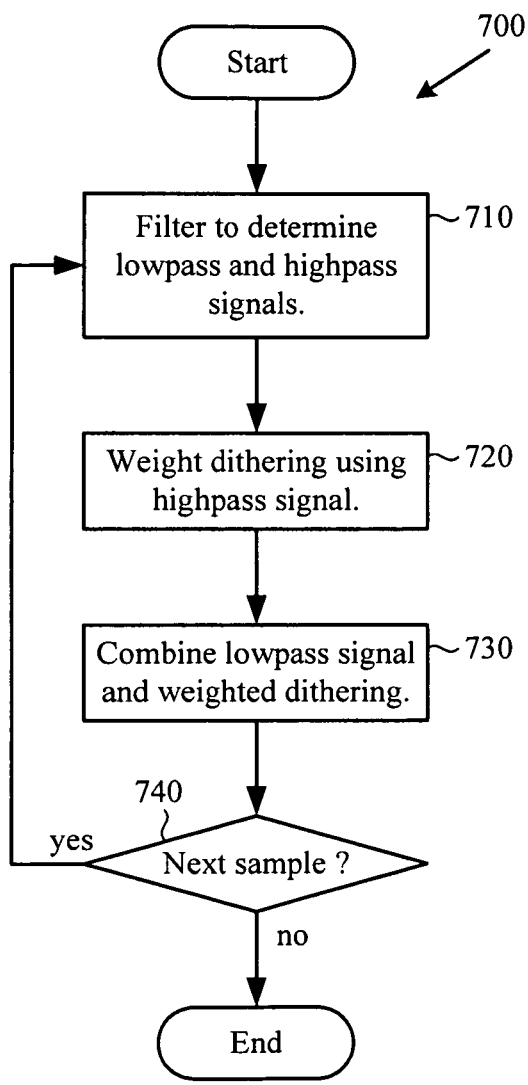
FIG. 7 is a flowchart showing details of the weighted filtering and dithering of FIG. 4 according to a second group of approaches, in which the relative weight of the dithering varies depending on characteristics of a highpass residual signal.

FIG. 7 shows a technique (700) for weighted filtering and dithering for an input picture, in which the relative weight of the dithering varies depending on characteristics of a highpass residual signal. A system such as the processing system (200) shown in FIG. 2 or other system performs the technique (700) during pre-processing. Alternatively, the technique (700) is performed during post-processing of pictures after decoding or at another stage of processing.

The system filters (710) samples of the input picture to determine lowpass filtered versions and a highpass residual. For example, the system uses a lowpass filter then determines the highpass filtered version as the difference between the original and the lowpass filtered version. Or, the system uses a highpass filter, or uses both highpass and lowpass filters. For a lowpass filter, the system can use a de-ringing filter, a filter for removing film scan artifacts, or other filter.

The system weights (720) the dithering signal that is added to a given sample based on the local statistics of the highpass residual around the sample. For example, the system computes local statistics of the highpass residual around the sample as described in the next section. Alternatively, the system computes local statistics using one or more other measures of local complexity or noisiness. The system combines (730) the lowpass signal value for the sample with the weighted dithering value for the sample. For example, the system simply adds the two components.

The system then determines (740) whether to end or continue with the lowpass and highpass signals for the next sample. In this way, the system continues on a sample-by-sample basis through the samples of the picture. Although FIG. 7 shows the technique (700) repeating on a sample-by-sample basis, alternatively, the system repeats all or part the technique (700) on some other basis, for example, filtering the entire picture before performing the weighting (720) and the combining (730) on a sample-by-sample basis. In some implementations, the samples subjected to the combined filtering and dithering according to the technique (700) are previously clipped to a lower bit depth, converted to a color space for encoding, and chroma sub-sampled. In other implementations, one or more of the clipping, color space conversion and chroma sub-sampling stages follows the combined filtering and dithering.

2. Example Implementations

This section provides implementation details for example implementations of the second group of approaches. In general, the combined filtering and dithering for these approaches has two integrated components: a 2D lowpass filter and dithering. In practice, these can be performed at the final rounding stage of lowpass filtering during pre-processing before encoding. For a current picture I(x, y), the combined filtering and dithering can be implemented as follows.

The system determines a lowpass signal and a highpass signal for the current image I(x, y). The following equation shows the general relation between the lowpass signal F(x, y) and the highpass residual signal Resid(x, y) in some implementations.

$$\text{Resid}(x,y) = I(x,y) - F(x,y) \tag{6}$$

The filter(s) used to determine the lowpass and highpass signals can vary depending on implementation, for example, to target removal of certain types of image artifacts in the input picture. Generally, to preserve image detail, the kernel size is kept relatively small. Two example filters have a 3×3 kernel shape. An example de-ringing filter, adapted to remove ringing artifacts, has symmetric taps {{1, 1, 1}, {1, 2, 1}, {1, 1, 1}} and a normalization factor of 10. An example film scan artifact filter, adapted to remove certain types of film scan artifacts, uses different taps. When the scan line is along the vertical direction, the filter taps are {{1, 0, 1}, {1, 2, 1}, {1, 0, 1}} and the normalization factor is 8, so the "not-trustable" neighboring samples along vertical direction are not considered. Similarly, when the scan line is along the horizontal direction, the filter taps are {{1, 1, 1}, {0, 2, 0}, {1, 1, 1}}. The film scan artifact filter tends not to over-filter video, and it typically preserves film grain, which is important to some content producers. The de-ringing filter and film scan artifact filter can have different taps and/or normalization factors. Alternatively, the system selects between other and/or additional filters, or uses a single default filter.

The system determines a dithering strength D(x, y) using the highpass residual signal Resid(x, y). In general, the system sets the dithering strength according to local statistics of the residual. For example, the system sets the mean absolute value of the dithering strength to be proportional to the mean absolute value of the filter residual around the location of a current sample. The window size for the area around the current sample can be 3×3 or have some other size. In some implementations, the system implements the following logic to decide the strength of the dithering noise signal for each sample value. The system computes mean absolute value $\mu_{abs}$ (equation 7) and constrained mean absolute value $\mu_{abs\_constrained}$ (equation 8) of the residual signal Resid(x, y) within a 3×3 window V surrounding the current sample.

$$\mu_{abs} = \frac{1}{9} \sum_{(x,y) \in V} |Resid(x, y)|, \tag{7}$$

$$\mu_{abs\_constrained} = \frac{1}{N_c} \sum_{(x,y) \in V} |Resid(x, y)| \cdot C(x, y). \tag{8}$$

C(x, y) and $N_c$ are defined as follows:

$$N_c = \sum_{(x,y) \in V} C(x, y), \tag{9}$$

$$C(x, y) = \begin{cases} 1, & \text{if } |Resid(x, y)| < \mu_{abs} \cdot \sigma \\ 0, & \text{otherwise} \end{cases}, \tag{10}$$

where σ is a tuning parameter whose value depends on implementation. Example values for the factor σ are between 1.5 and 3.0. The system then computes the dithering noise strength D(x, y) for the current sample as follows.

$$D(x,y) = \mu_{abs\_constrained} \cdot \gamma \tag{11},$$

where γ is a tuning parameter whose value depends on implementation. Example values for the factor γ are γ=1.

In some implementations, the system checks whether the value of the residual signal Resid(x, y) at the location of the current sample value significantly varies from the average level in the immediate neighborhood. The system can check whether the current value is much higher or lower than the average. If so, the current sample value is not filtered, nor is dithering added to it. In some situations, this helps avoid blurring edges. For example, the system checks constraints before filtering and dithering are actually performed on any sample value, so as to help preserve edges in the picture. The system can implement the constraints as follows. For a location in the residual signal Resid(x, y), the system computes the mean μ (equation 12) in the window V, then checks whether the constraints shown in equations 13 and 14 are satisfied.

$$\mu = \frac{1}{9} \sum_{(x,y) \in V} Resid(x, y), \quad (12)$$

$$|\mu| < \mu_{abs} \cdot \alpha, \quad (13)$$

$$|Resid(x, y)| < \mu_{abs\_constrained} \cdot \beta, \quad (14)$$

where α and β are tuning parameters whose values depend on implementation. Example values of α and β are α=⅓ and β=1.75.

The values of tuning parameters such as σ, α, β and γ can be set by default, or they may adjusted by the user or system. For example, in some implementations, the user can change the filter strength and/or the dithering strength by changing the value of β to be one of {1.25, 1.5, 1.75, 2.0, 2.25} and/or changing the value of γ to be one of {0.5, 0.75, 1.0, 1.25, 1.5}.

Alternatively, the system implements different logic to decide the strength of the dithering noise signal at the respective samples.

To add weighted dithering at a location, the system combines the lowpass filtered signal value F(x, y) with the weighted dithering signal at the location.

$$s'(x,y) = F(x,y) + D(x,y) \cdot r(x,y) \quad (15).$$

where r(x, y) represents the value for the dithering noise signal at location (x, y), and where the dithering strength D(x, y) acts as a first-order modulator. In general, the dithering noise signal r(x, y) is a normalized random signal field. It can be implemented as described above for the dithering signal in the first group of approaches.

F. Extensions and Alternatives

Although many of the examples presented herein involve the application of pre-processing before encoding, the filtering and/or dithering techniques described herein can instead be performed during post-processing after decoding, before playback. For example, the techniques for reducing banding artifacts with combined filtering and dithering can be used to ameliorate banding artifacts caused by 10-bit to 8-bit conversion during pre-processing, by 8-bit or other limits on transfers of samples from a decoder to a display, or by an encoder allocating too few bits to regions that are (erroneously) classified as uniform. The filtering can be applied as explained above, or simplified to use only a 1D horizontal or 1D vertical kernel.

This section documents some of the other extensions, alternatives and applications of the techniques and tools presented above.

In some embodiments, a system adds a dithering signal to sample values, and the strength of the dithering signal changes depending on whether the dithering signal is being added to luma samples or chroma samples. In general, the dithering signal strength can potentially be higher in chroma channels since the perceptual impact of chroma changes is relatively lower than that of luma changes. This mechanism for luma/chroma-dependent strength adjustment for dithering can be used in combination with filtering or without filtering, and with or without other dithering adjustment mechanisms. It can be used as part of pre-processing before encoding or at another stage.

In some embodiments, a system adds a dithering signal to sample values, and the strength of the dithering signal changes depending on local image complexity. This mechanism for image complexity-dependent strength adjustment for dithering can be used in combination with filtering or without filtering, and with or without other dithering adjustment mechanisms. It can be used as part of pre-processing before encoding or at another stage.

In some embodiments, a system adds a dithering signal to chroma sample values, and the strength of the dithering signal changes depending on chroma sensitivity. This mechanism for chroma sensitivity-dependent strength adjustment for dithering can be used in combination with filtering or without filtering, and with or without other dithering adjustment mechanisms. It can be used as part of pre-processing before encoding or at another stage.

In some embodiments, a system filters chroma sample values, and the strength of the filtering changes depending on chroma sensitivity. This mechanism for chroma sensitivity-dependent strength adjustment for filtering can be used in combination with dithering or without dithering, and with or without other filtering adjustment mechanisms. It can be used as part of pre-processing before encoding or at another stage.

In some embodiments, a system selectively performs combined filtering and dithering depending on the flatness of a region. This mechanism for selective filtering and dithering can be used in combination with the filtering and dithering implementations described above, or in combination with other implementations of filtering and/or dithering. It can be used as part of pre-processing before encoding or at another stage.

In some embodiments, a system uses the filtering described above in the first group of approaches apart from any dithering. This adaptive lowpass filter helps preserve edges while selectively smoothing. This filtering mechanism can be used as part of pre-processing before encoding or at another stage.

In some embodiments, a system uses a scan artifact removal filter, as described above in the second group of approaches, apart from any dithering. The scan artifact removal filter can be used on its own, or it can be selected from a group of available filters also including, for example, a de-ringing filter. These filtering mechanisms can be used as part of pre-processing before encoding or at another stage.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:
during pre-processing of video before encoding of the video, reducing artifacts in the video by performing combined filtering and dithering on the video such that relative weight of the dithering at a location depends at least in part on results of the filtering at the location, wherein the dithering reduces banding artifacts in the video by adding to the video a dithering signal based on a noise signal, and wherein the pre-processing further includes:
selecting a type of filter from among plural available types of filters, each of the plural available types of filters being adapted for removal of a different type of artifact, wherein the plural available types of filters include a first type adapted for removing film scan artifacts and a second type adapted for removing ringing artifacts, and wherein the filtering uses the selected type of filter;
encoding the dithered, filtered video to produce a bit stream; and
outputting the bit stream.

2. The method of claim 1 wherein the performing combined filtering and dithering further comprises:
changing the relative weight of the dithering at the location depending on local characteristics of a residual signal for the video.

3. The method of claim 1 wherein the performing combined filtering and dithering comprises:
determining a lowpass signal and a highpass signal for the video;
weighting the dithering based at least in part on local characteristics of the highpass signal; and
combining the lowpass signal with the weighted dithering.

4. The method of claim 1 wherein the performing combined filtering and dithering further includes:
changing the relative weight of the dithering at the location depending on how many sample values around the location are within a threshold of similarity to a current sample value at the location.

5. The method of claim 1 wherein the relative weight of the dithering varies inversely with strength of the filtering such that the relative weight of the dithering increases when the strength of the filtering decreases.

6. The method of claim 1 further comprising, before the encoding:
clipping the dithered, filtered video.

7. The method of claim 1 wherein the dithering signal includes an offset value for the location, the offset value to be added to a sample value at the location.

8. The method of claim 1 wherein the noise signal is based on white noise or blue noise, and wherein the noise signal is generated as a two-dimensional array of values or three-dimensional array of values.

9. The method of claim 1 wherein the noise signal is a three-dimensional array of white noise values filtered with a highpass filter.

10. The method of claim 1 wherein the noise signal is a normalized random signal field.

11. A computing system that includes one or more processors and memory, wherein the computing system is adapted to perform a method of combined filtering and dithering comprising:
selecting a type of filter from among plural available types of filters, each of the plural available types of filters being adapted for removal of a different type of artifact, wherein the plural available types of filters include a first type adapted for removing film scan artifacts and a second type adapted for removing ringing artifacts;
filtering video using a filter whose normalization factor varies at a location depending on how many sample values around the location are within a threshold of similarity to a current sample value at the location, wherein the filtering uses the selected type of filter;
reducing banding artifacts by adding dithering to the filtered video, wherein the dithering adds at the location an offset value for the current sample value, the offset value being based on a noise signal;
encoding the dithered, filtered video to produce a bit stream; and
outputting the bit stream.

12. The computing system of claim 11 wherein the filtering uses a first strength value for a luma channel of the video and a second strength value for a chroma channel of the video, and wherein the first strength value is different than the second strength value.

13. The computing system of claim 11 wherein the filtering includes:
along each of one or more lines of samples values over the location, determining a count of candidate sample values whose respective differences compared to the current sample value at the location are less than the threshold; and
setting the normalization factor using results of the determining.

14. The computing system of claim 11 wherein the dithering uses a first strength value for a luma channel of the video and a second strength value for a chroma channel of the video, and wherein the first strength value is different than the second strength value.

15. The computing system of claim 11 wherein the method further comprises:
evaluating flatness of a region, wherein performance of the filtering and the adding for the region depends at least in part on results of the evaluating.

16. The computing system of claim 11 wherein the method further comprises adjusting strength of the filtering and/or the adding for a chroma channel of the video depending on chroma sensitivity.

17. The computing system of claim 11 wherein the noise signal is based on white noise or blue noise, and wherein the noise signal is generated as a two-dimensional array of values or three-dimensional array of values.

18. The computing system of claim 11 wherein the noise signal is a normalized random signal field.

19. A computing system that includes one or more processors and memory, the computing system further comprising:
means for pre-processing video for encoding, wherein the pre-processing includes:
selecting a type of filter from among plural available types of filters, each of the plural available types of filters being adapted for removal of a different type of artifact, wherein the plural available types of filters include a first type adapted for removing film scan artifacts and a second type adapted for removing ringing artifacts;

selectively filtering the video to smooth the video, wherein the filtering uses the selected type of filter;

reducing banding artifacts by adding dithering, wherein a relative weight of the dithering at a location depends at least in part on results of the filtering at the location, and wherein the dithering at the location adds at the location an offset value based on a noise signal; and clipping the dithered, filtered video;

a video encoder for encoding the pre-processed video; and means for outputting the encoded video in a compressed video bit stream.

20. The computing system of claim 19 wherein the pre-processing further includes changing relative strength of the adding depending on local image complexity of the video.

21. The computing system of claim 19 wherein the pre-processing further includes changing relative strength of the adding depending whether processing a luma channel of the video or a chroma channel of the video.

22. The computing system of claim 19 wherein the noise signal is based on white noise or blue noise, and wherein the noise signal is generated as a two-dimensional array of values or three-dimensional array of values.

23. The computing system of claim 19 wherein the noise signal is a normalized random signal field.

24. The computing system of claim 11 wherein the noise signal is a three-dimensional array of white noise values filtered with a highpass filter.

25. The computing system of claim 19 wherein the noise signal is a three-dimensional array of white noise values filtered with a highpass filter.

* * * * *